(12) United States Patent
Venturi et al.

(10) Patent No.: US 11,266,996 B2
(45) Date of Patent: Mar. 8, 2022

(54) CONTROL METHOD OF A TREATMENT PLANT OF ELEMENTS TO BE RECYCLED OR DISPOSED AND A TREATMENT PLANT OF ELEMENTS TO BE RECYCLED OR DISPOSED

(71) Applicant: CAMS S.r.l., Castel San Pietro Terme (IT)

(72) Inventors: Marco Venturi, Bologna (IT); Mauro Biavati, Ferrara (IT)

(*) Notice: Subject to any disclaimer, the term of this patent is extended or adjusted under 35 U.S.C. 154(b) by 61 days.

(21) Appl. No.: 16/489,719

(22) PCT Filed: Feb. 22, 2018

(86) PCT No.: PCT/IB2018/051104
§ 371 (c)(1),
(2) Date: Aug. 29, 2019

(87) PCT Pub. No.: WO2018/158665
PCT Pub. Date: Sep. 7, 2018

(65) Prior Publication Data
US 2019/0381512 A1    Dec. 19, 2019

(30) Foreign Application Priority Data
Mar. 2, 2017  (IT) .......................... 102017000023357

(51) Int. Cl.
*B02C 21/02* (2006.01)
*B02C 18/22* (2006.01)
(Continued)

(52) U.S. Cl.
CPC .......... *B02C 21/02* (2013.01); *B02C 18/2233* (2013.01); *B02C 25/00* (2013.01); *B02C 4/286* (2013.01)

(58) Field of Classification Search
CPC .......... B02C 21/02; B02C 25/00; B02C 4/286; B02C 23/02; B02C 23/08–16;
(Continued)

(56) References Cited

U.S. PATENT DOCUMENTS

| 7,322,536 B2 * | 1/2008 | Garvin ................. B02C 13/286 |
| | | 241/275 |
| 7,938,272 B2 * | 5/2011 | Antila .................... B07B 1/005 |
| | | 209/247 |

(Continued)

FOREIGN PATENT DOCUMENTS

| EP | 1545803 | 6/2005 |
| JP | 2002346429 | 12/2002 |

*Primary Examiner* — Jessica Cahill
*Assistant Examiner* — Smith Oberto Bapthelus
(74) *Attorney, Agent, or Firm* — Themis Law

(57) ABSTRACT

A control method of a treatment plant for elements to be recycled or disposed of, which includes a crushing roll adapted to reduce the size of the elements to be recycled or disposed of, a screen operatively arranged upstream of the crushing roll and adapted to enable passage therethrough only of elements to be recycled or disposed of having a size larger than a predetermined size, and a conveyor belt arranged operationally upstream of the screen to provide the screen with the elements to be recycled or disposed of, includes a measuring step of the volume of material lying on the conveyor belt; a comparing step of the measured volume value to a first predetermined value; and an increasing step of the vibration intensity of the screen if the measured volume value exceeds the first predetermined value.

5 Claims, 2 Drawing Sheets

(51) Int. Cl.
*B02C 25/00* (2006.01)
*B02C 4/28* (2006.01)

(58) Field of Classification Search
CPC ... B02C 21/00–026; B07B 1/005; B07B 1/28;
B07B 1/42
USPC .......................................................... 241/25
See application file for complete search history.

(56) References Cited

U.S. PATENT DOCUMENTS

| | | | |
|---|---|---|---|
| 2003/0029946 A1 | 2/2003 | Lieber | |
| 2011/0077821 A1* | 3/2011 | Yamaguchi | B02C 25/00 701/36 |
| 2011/0089270 A1* | 4/2011 | Juha | B02C 21/00 241/25 |
| 2011/0210083 A1* | 9/2011 | Scott | B01D 33/0376 210/785 |
| 2014/0263777 A1* | 9/2014 | Anderson, Jr. | B02C 25/00 241/30 |
| 2015/0283581 A1* | 10/2015 | Jones | B07B 1/284 209/369 |
| 2016/0369371 A1* | 12/2016 | Conway | B02C 23/14 |
| 2018/0193880 A1* | 7/2018 | Dumbaugh | B65G 27/30 |
| 2018/0345320 A1* | 12/2018 | Fujimoto | B06B 1/166 |
| 2020/0030812 A1* | 1/2020 | Jacobson | B02C 2/047 |

\* cited by examiner

CONTROL METHOD OF A TREATMENT PLANT OF ELEMENTS TO BE RECYCLED OR DISPOSED AND A TREATMENT PLANT OF ELEMENTS TO BE RECYCLED OR DISPOSED

DEFINITIONS

In the present invention, the term "elements to be recycled or disposed of" means construction residual materials, road residual materials, foundry wastes, mineral processing wastes, glass processing wastes, plastic processing wastes, or the like.

FIELD OF APPLICATION

The present invention is generally applicable to the technical field of the disposal of processing or dismantling residues of buildings, objects, plants, and refers to the treatment of elements to be recycled or disposed of such as debris deriving from the demolition of buildings, or from the removal or reconstruction of different works, or the like, residues from metals, plastics, or glass processing, or the like.

More in detail, the present invention relates to a treatment plant for elements to be recycled or disposed of in order to reduce their size.

STATE OF THE ART

Even partial demolition of buildings due to restructuring or due to destructive events as well as the rebuilding of different works or other human works generates typically rubble having large sizes. They must obviously be disposed of, and often their size, combined with the corresponding weight they have, make this disposal complex, and sometimes very difficult.

In this sense, different types of machines for reducing the size of the rubble are known. First of all, the rubble crushers are known that allow to reduce large slabs, portions of beams or the like, in boulders of smaller dimensions.

However, it is generally necessary that the material from the reducing treatment is particularly compact, and similar, for example, to sand or, at least, to pebbles. In order to achieve this, screenings and crushing rolls are generally used, the operation of which allows to properly chop the residue obtained from a crusher.

Since the operations of loading of the crusher and the unloading of the crushed material, and of loading of a screen and loading of a crushing roll require time and the intervention of a specialized workmanship, in order to optimize the processing and reduce the costs, machines or treatment plants have been designed for elements to be recycled or disposed of, which incorporate or have series of several processing stations such as crushers, screens and crushing rolls. In this sense, they typically also include conveyor belts for transferring the material from one station to another.

These machines and plants, however, are subject to working interruptions or failure and, in any case, to the continuous monitoring and intervention of personnel.

In addition, it is also known that the interruptions of the various work stations takes a few seconds to completely stop the motors and then to restart them. Since the machine downtime can occur various times in a day's work due to the mixed composition of the residue to be treated, it follows that at the end of the day the lack in productivity becomes significant.

Typically, the crushing roll is the last station of the line and is the one that, in the event of problems, is likely to cause the blockage of all the other stations. Since its operation can be seriously compromised by the incorrect providing of material, it is essential that the screen that operates immediately upstream is perfectly operational and correctly functioning.

However, if too much material is allowed on the screen, it tends to slow down the vibrations due to overload. This has as a result that a material that does not require further processing is provided to the crushing roll, decreasing the productivity of the plant, but with the risk of damaging the screen due to excessive load. It follows that the material conveyed by the conveyor belt to the screen must always be in the correct amount, or in any case not higher than a predetermined threshold.

In such cases, in fact, in known plants it is necessary to stop the transfer of material to the conveyor belt.

However, this operation leads to the necessary shut-down of the upstream processing stations, resulting in a significant reduction in operating effectiveness. The momentary non-flow of material downstream, however, typically require the complete shut-down of the plant.

PRESENTATION OF THE INVENTION

The object of the present invention is to overcome at least partially the drawbacks noted above, providing a treatment plant for elements to be recycled or disposed of which allows reducing, if not eliminating at all, the risk of having to stop it during processing.

Within the scope of this general purpose, a particular object is to avoid that a possible accumulation of material on the conveyor belt results in, if not in particular cases, the complete shut-down of all the stations of the treatment plant.

Another object is to avoid as much as possible that the aforementioned accumulation leads to the partial shut-down of the plant.

Another object of the invention is to provide a treatment plant which allows to avoid or minimize the presence of specialized personnel who monitor its operation.

In other words, an object of the present invention is to provide a treatment plant for materials to be recycled or disposed, which has a processing yield higher than the known equivalent plants so as to minimize the costs in terms of personnel to be dedicated to its operation and in economic terms.

Such aims, as well as others which will be clearer below, are achieved by a control method of a treatment plant for elements to be recycled or disposed of according to the following claims, which are to be considered as an integral part of this patent.

In particular, the plant controlled according to the method of the invention comprises at least one crushing roll for a reduction in size of the elements to be recycled or disposed of, and at least one screen to allow passage to the crushing roll only to elements having a size greater than predetermined sizes. There is provided also at least one conveyor belt operatively arranged upstream of the screen for conveying and transferring the elements to be recycled or disposed of.

With the plant thus configured, the method of the invention comprises a measurement step, preferably but not necessarily by means of appropriate volumetric sensors, of the volume of elements to be recycled or disposed lying on the conveyor belt.

Then there is provided a comparison step of the measured value to a first predetermined value that corresponds to a pre-alarm value. If the comparison shows an accumulated volume higher than the pre-alarm value, then there is an increasing step of the vibration intensity of the screen.

This allows to avoid, advantageously, that the sudden increase in the transfer of residue to the screen causes its overload, resulting a consequent slowing of its efficiency.

It is evident, therefore, that in a such manner the productivity of the plant of the invention is increased with respect to the known equivalent machines.

From the above, it is evident that said objects are achieved by a treatment plant for elements to be recycled or disposed of, comprising:
  at least one crushing roll for a reduction in size of the elements to be recycled or disposed of;
  at least one screen operatively arranged upstream of said crushing roll to allow passage to said crushing roll only of elements having a size larger than predetermined sizes;
  at least one conveyor belt operatively arranged upstream of said screen for conveying and transferring the elements to be recycled or disposed of,
said plant also comprising:
  one or more volumetric sensors for measuring the residue lying on said conveyor belt;
  at least one control circuit operatively connected to said volumetric sensors and at least to said screen to increase the vibrations in case a measurement of said volume is higher than a first predetermined value.

Advantageously, inter alia, the presence of the control circuit allows to reduce, and possibly eliminate at all, the need for the presence of personnel in charge of controlling and managing the plant of the invention with respect to what happens for the known equivalent plants.

This still allows, advantageously, to further increase the yield of the plant according to the invention by reducing operating costs.

BRIEF DESCRIPTION OF THE DRAWINGS

Further features and advantages of the invention will be more apparent in light of the detailed description of some preferred, but not exclusive, embodiments of a method of controlling a treatment plant for elements to be recycled or disposed of according to the invention, illustrated by way of non-limiting example with the aid of the accompanying drawings tables, wherein.

DETAILED DESCRIPTION OF AN EXEMPLARY PREFERRED EMBODIMENT OF THE INVENTION

As previously mentioned, the object of the patent is both a method of controlling a treatment plant for elements to be recycled or disposed of, and the plant itself.

Figure 1:
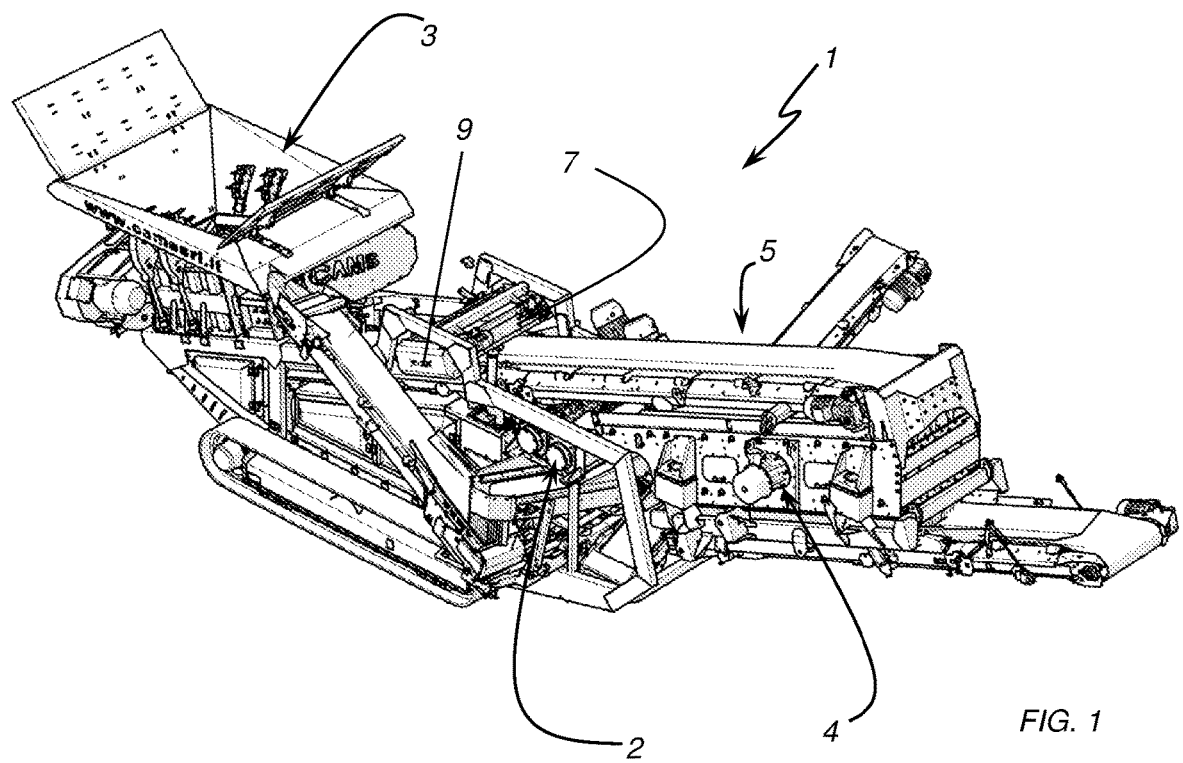
FIG. 1 represents a plant for processing elements to be recycled or disposed of according to the invention in an axonometric view.
Figure 2:
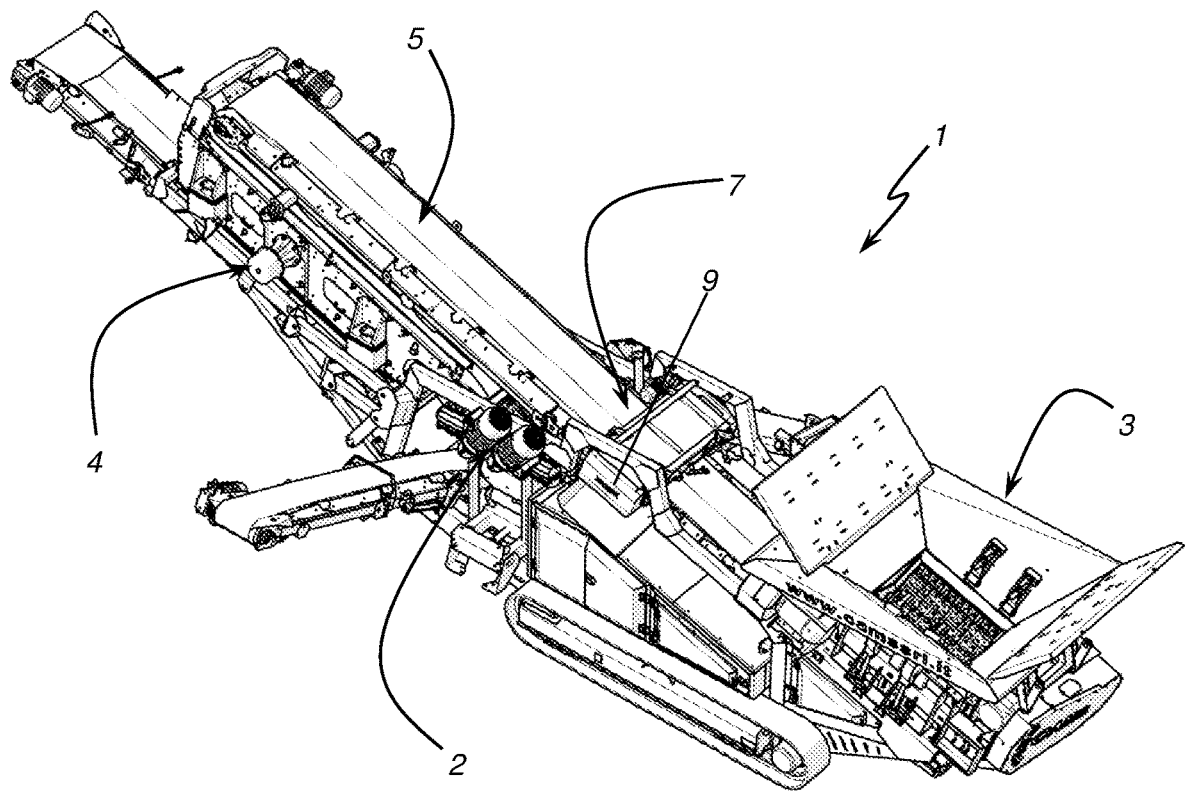
FIG. 2 represents a further axonometric view of the plant of FIG. 1.

In this sense, with reference to the figures above, and in particular to FIGS. 1 and 2, a treatment plant 1 for the elements to be recycled or disposed of is described, which is typically usable for the reduction of such elements to be recycled or disposed of to a resulting material having a size like to sand or, at most, to pebbles.

For this reason, the plant 1 of the invention comprises a crushing roll 2 for a reduction in size of the elements to be recycled or disposed of.

Typically, however, the size of the elements to be recycled or disposed of is often particularly large so that, according to an aspect of the invention, the plant also comprises a crusher 3 for roughing out the size of the elements.

Advantageously, therefore, the plant 1 can comprise two or more crushing stations for elements to be recycled or disposed of, in order to extend the type of residues to be treated.

According to another aspect of the invention, a screen 4 is interposed operatively upstream of the crushing roll 2, and downstream of the crusher 3, if present, to allow passage to the crushing roll 2 only of residues having a size larger than predetermined sizes. In this way, advantageously, the likelihood that the crushing roll 2 must devote time to the processing of material already reduced in size is reduced.

Downstream of the crushing roll 2 there is a recirculation circuit whose function is to bring the treated material back to the screen 4 so as to ensure that, in the case of the non-conforming material coming out of the crushing roll 2, it undergoes further processing by the crushing roll 2 itself.

Figure 3:
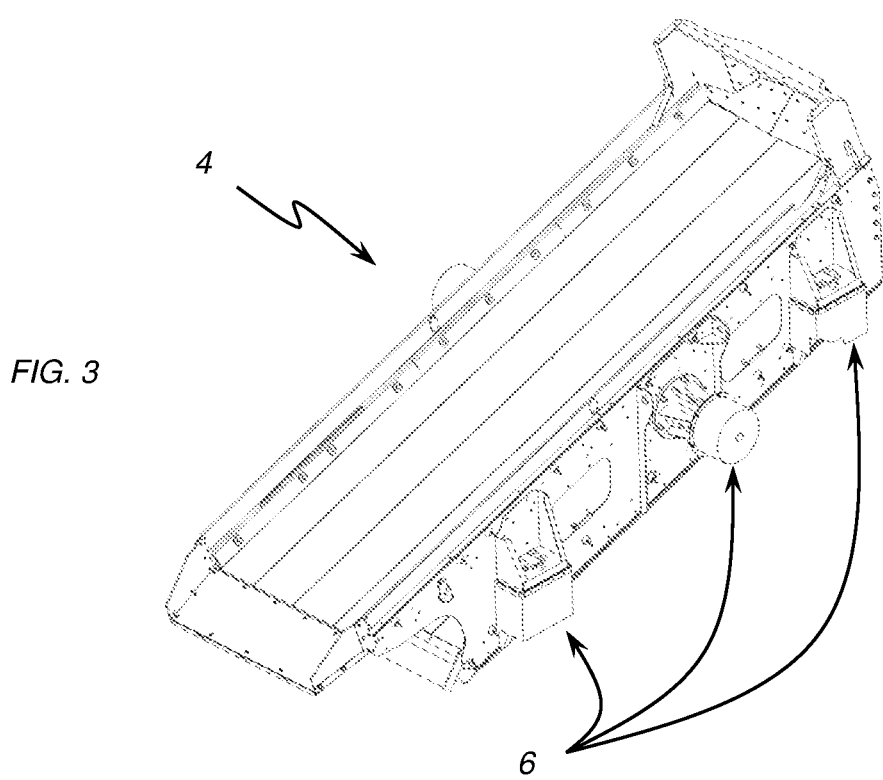
FIG. 3 represents a detail of the plant of FIG. 1.

According to the described embodiment, the screen 4 typically comprises, as can be seen in the detail of FIG. 3, a plurality of shafts 6 whose rotation generates the vibrations of the screen 4 itself. The control of their rotation speed, therefore, allows to adjust the vibration intensity or frequency of the screen 4.

In order to correctly manage the flow to the screen 4 of the elements to be recycled or disposed of, a conveyor belt 5 is arranged upstream of the same. The presence of the latter is particularly advantageous if the plant 1 also includes the crusher 3.

According to a further aspect of the invention, the plant 1 also comprises a volumetric sensor 7 for measuring the elements lying on the conveyor belt 5.

There is also provided a control circuit 9 operatively connected to the volumetric sensor 7 and to the shafts 6 of the screen 4 to increase their rotation speed, and therefore the vibration intensity or frequency of the screen 4, if the difference between the measured volume and the volume for which the screen 4 is initially set is higher than a predetermined threshold value.

In other words, if there is an increase in the volume of the elements to be recycled or disposed of, that the conveyor belt 5 will transfer to the screen 4, the latter is adjusted to vibrate more so as to be able to cope with this increase without creating an overload.

According to the described embodiment, this increase in vibration is controlled by the control circuit 9, which controls an acceleration of the rotation speed of the shafts 6 of the screen 4.

Advantageously, therefore, if the screen 4 is expected to undergo an excessive work, this eventuality is prevented before it can cause problems to the screen 4.

Still advantageously, the modification of the configuration of the screen 4 itself allows to avoid any damages thereof or to reach a load such as to force the machine to stop. The crushing roll 2 operatively downstream, therefore, can continue its work without any problems.

In this way, still advantageously, the productivity of the treatment plant 1 is increased with respect to the known equivalent plants, since the situations which require it to stop are reduced.

Still advantageously, the presence of the control circuit 9 allows to reduce, and possibly eliminate at all, the need for the presence of personnel in charge of controlling and managing the plant 1 of the invention with respect to what happens for the known equivalent plants.

This still allows, advantageously, to further increase the yield of the plant 1 according to the invention by reducing operating costs.

Obviously, the number of crushers, conveyor belts, screens and crushing rolls are non-limiting characteristics of the invention, since it can be any number. Likewise, neither the number of volumetric sensors nor the number of screen shafts should be considered as limiting.

As previously mentioned, the object of the present patent is also the method of managing the plant 1 described above.

According to an aspect of the invention, the method comprises a step of measuring the volume of the elements to be recycled or to dispose of, lying on the conveyor belt 5 and which are directed to the screen 4.

Then follows a step of comparing the measured value to a first predetermined value corresponding to the maximum volume allowed in order to avoid overloading the screen 4. This first predetermined value is, therefore, a pre-alarm value.

If the comparison shows a difference between the two values, than there is a subsequent step of reconfiguration of the screen 4 to increase the vibration intensity thereof. As said, this effect is obtained by increasing the rotation speed of the shafts 6.

Obviously, in the event that the measured volume decreases thereafter, there is a step of decreasing the vibration intensity of the screen 4 also obtained by acting on the rotation speed of the shafts 6.

Advantageously, therefore, the volume control of the elements to be recycled or disposed of on the conveyor belt 5 not only can avoid a subsequent machine downtime as far as possible, but also allows the original operating effectiveness to be restored as quickly as possible, optimizing production and maximizing profits thereof.

The increase in the volume of residues on the conveyor belt 5 can be due to various causes. However, if it is not a purely instantaneous phenomenon, it is evident that a reduction in the providing of elements to be treated on the belt 5 is advisable. In this sense, if the aforementioned crusher 3 is upstream of the conveyor belt 5, according to another aspect of the invention, it is operatively connected to the control circuit 9 so as to modify its operation accordingly.

In particular, the control method of the invention comprises a step of slowing down the operation of the crusher 3 simultaneously with the previously mentioned step of increasing the vibration intensity of the screen 4.

Typically, but not necessarily, the crushers 3 comprise two or more crushing shafts whose rotation allows appropriate discs mounted thereon to act on the elements to be recycled or disposed of and to fractionate them into smaller elements. In this case, the slowing down of the operation of the crusher 3 is obtained by slowing down the rotation of one or more of these shafts or by stopping some of them.

The above leads to a slowdown in the productivity of the treatment plant 1. However, if the plant 1 continued at an unchanged pace, the operators would then be forced to perform a downtime, thus reducing overall productivity thereof.

There are also cases in which the actions envisaged above may not allow the problem to be solved, i.e., there may be a further increase in the volume of residue lying on the conveyor belt 5.

If the measured volume exceeds a second predetermined value (corresponding to an alarm threshold), the method of the invention comprises a step of stopping the crusher 3 and a further step of increasing the rotation speed of the shafts 6 of the screen 4, i.e. a further step of increasing the vibration intensity of the screen 4.

In any case, with measured volume values falling below the predetermined values mentioned above, the optimal processing settings of the plant 1 of the invention can be restored.

Since the primary purpose of the present invention is to limit as far as possible the machine downtime, with the plant 1 of the invention such situation occurs only in particular cases, and therefore the productivity is certainly increased compared to known equivalent plants.

For this reason it is clear that the method of the invention of controlling a treatment plant for elements to be recycled or disposed of, as well as the plant itself, achieve all the intended purposes.

In particular, the risk of having to completely stop the plant during processing is reduced, if not eliminated at all.

Furthermore, the need for the presence of specialized personnel within the machine is avoided or minimized.

More specifically, the processing efficiency of the plant of the invention controlled by the method of the invention is higher than the known equivalent plants, inter alia, also minimizing the costs in terms of personnel to be dedicated to its operation.

The invention may be subject to many changes and variations, which are all included in the appended claims. Moreover, all the details may furthermore be replaced by other technically equivalent elements, and the materials may be different depending on the needs, without departing from the scope of protection of the invention defined by the appended claims.

The invention claimed is:
1. A control method of a treatment plant for elements to be recycled or disposed of, comprising:
   providing at least one crushing roll adapted to reduce a size of the elements to be recycled or disposed of;
   providing at least one screen operatively arranged upstream of said crushing roll to allow passage to said crushing roll only of the elements to be recycled or disposed of having a size larger than a predetermined size;
   providing at least one conveyor belt operatively arranged upstream of said screen for conveying and transferring the elements to be recycled or disposed of;
   providing a crusher operatively arranged upstream of said conveyor belt for a first roughing out of the size of the elements to be recycled or disposed of;
   measuring a volume of the elements to be recycled or disposed lying on said conveyor belt to determine a measured volume value;
   comparing said measured volume value with a first predetermined value;
   increasing a vibration intensity of said at least one screen in case said measured volume value exceeds said first predetermined value; and
   slowing down an operation of said crusher simultaneously with said increasing said vibration intensity of said at least one screen.

2. The control method according to claim 1, further comprising a stopping step of said crusher if said measured volume value is greater than a second predetermined value.

3. The control method according to claim 2, wherein, simultaneously to said stopping step of said crusher, there is provided a further increasing step of said vibration intensity of said at least one screen.

4. A treatment plant for elements to be recycled or disposed of, comprising:
- at least one crushing roll for a reduction in size of the elements to be recycled or disposed of;
- at least one screen operatively arranged upstream of said at least one crushing roll to allow passage to said crushing roll only of the elements to be recycled or disposed of having a size larger than a predetermined size;
- at least one conveyor belt operatively arranged upstream of said at least one screen for conveying and transferring the elements to be recycled or disposed of,
- one or more volumetric sensors for measuring a volume of the elements lying on said at least one conveyor belt;
- at least one control circuit operatively connected to said one or more volumetric sensors and at least to said screen to increase vibrations of said screen in case a measurement of said volume is higher than a first predetermined value; and
- at least one crusher operatively arranged upstream of said at least one conveyor belt for a first roughing out of the elements to be recycled or disposed of, said at least one control circuit being operatively connected also to said crusher to vary a crushing speed in case of the measurement of the volume is different from a second predetermined value,
- wherein a vibration intensity of said at least one screen is increased in case said measurement of said volume exceeds said first predetermined value; and
- wherein operation of said crusher is slowed down simultaneously with increasing said vibration intensity of said at least one screen.

5. The treatment plant according to claim 4, wherein said at least one screen comprises at least one rotary shaft for generating the vibrations.

* * * * *